(12) United States Patent
Tanaka et al.

(10) Patent No.: US 7,201,989 B2
(45) Date of Patent: Apr. 10, 2007

(54) ELECTRONIC DEVICE USING FUEL CELLS

(75) Inventors: Akira Tanaka, Mito (JP); Tomoichi Kamo, Tokai (JP); Yasushi Muranaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 472 days.

(21) Appl. No.: 10/622,553

(22) Filed: Jul. 21, 2003

(65) Prior Publication Data
US 2004/0068671 A1 Apr. 8, 2004

(30) Foreign Application Priority Data
Oct. 2, 2002 (JP) ............... 2002-289363

(51) Int. Cl.
*H01M 2/14* (2006.01)
*G06F 1/26* (2006.01)

(52) U.S. Cl. ........................ 429/38; 713/300

(58) Field of Classification Search ............ 429/13, 429/22, 34
See application file for complete search history.

(56) References Cited

U.S. PATENT DOCUMENTS 6,954,852 B2 * 10/2005 Burokas et al. ............... 713/2
2002/0055029 A1 * 5/2002 Hayashi et al. ............... 429/34
2004/0096718 A1 * 5/2004 Gomez ........................ 429/30
2005/0008918 A1 * 1/2005 Nakakubo et al. ............ 429/34

FOREIGN PATENT DOCUMENTS

JP WO 03049223 A1 * 6/2002

* cited by examiner

*Primary Examiner*—Dah-Wei Yuan
*Assistant Examiner*—Karie O'Neill
(74) *Attorney, Agent, or Firm*—Antonelli, Terry, Stout & Kraus, LLP.

(57) ABSTRACT

An electronic device is provided with a fuel cell which is formed to introduce air from at least two surfaces of a casing of the fuel cell and to supply a fuel from an inside of the casing for high energy efficiency. The fuel cell is structured to form an air-supply space between the fuel cell and the electronic device and mounted in a manner that the surface of the fuel cell, which is on a reverse side of the surface facing the electronic device, is exposed to the ambient air. The electronic device is provided with a fuel cell structured to supply air from at least two surfaces of the casing to achieve better energy efficiency.

6 Claims, 3 Drawing Sheets

ELECTRONIC DEVICE USING FUEL CELLS

BACKGROUND OF THE INVENTION

This invention relates to an electronic device having a fuel cell, and more particularly to an information electronic device using a fuel cell of a type which directly oxidizes methanol.

Fuel cells have advantages of high energy efficiency in directly taking electric energy electro-chemically from a fuel, and eco-friendly because fuel cells' emission matter is chiefly water. Therefore, attempts are being made to apply fuel cells to automobiles, distributed power supplies, and information electronic devices. Above all, for information electronic devices, fuel cells are drawing attention as power supplies capable of long-term continuous operation to take the place of lithium batteries, and various kinds of information electronic devices are being devised which are equipped with fuel cells.

For example, there are an information electronic device with a built-in fuel cell made of hydrogen storing alloy (see JP-A-09-213359, p. 3, FIG. 1) and an information electronic device using a methanol fuel cell (see JP-A-2002-49440, p. 3, FIG. 2).

Among methanol fuel cells, a type which takes electricity by direct oxidation of liquid methanol, namely, the so-called Direct Methanol Fuel Cell hereafter referred to as DMFC has an advantage that the fuel cell does not require an auxiliary device, such as a reformer, therefore, the battery system is formed with relative ease compared with fuel cell stacks.

As a fuel for the cathode, oxygen is required, and normally air that includes oxygen is used.

Generally, with fuel cells, the larger cell surface, or, the larger electrode surface provides greater power output. However, because the size of electronic devices imposes a limit to the area of the fuel cell, the fuel cell needs to be formed in a structure that offers greater output while keeping the cubic volume unchanged.

SUMMARY OF THE INVENTION

Therefore, according to the present invention, instead of supplying air through one side of the casing of the fuel cell to generate electricity as in the prior art, a fuel cell is used which is so structured as to supply air through at least two surfaces of the casing of the fuel cell, and supplies fuel from the inside of the casing.

When such a fuel cell is mounted on an electronic device, it is necessary to supply air to the two air-intake surfaces of the casing of the fuel cell simultaneously.

The present invention has an object to provide a fuel cell for use on an electronic device, which is so structured as to supply air from at least two surfaces of the casing.

The fuel cell for use on an electronic device is not mounted in the electronic device as in the conventional design. This fuel cell is provided with an empty space for air to enter between the fuel cell and the electronic device, and is set in a manner that the side of the fuel cell which is opposite the side facing the electronic device is exposed to the ambient air.

Other objects, features and advantages of the invention will become apparent from the following description of the embodiments of the invention taken in conjunction with the accompanying drawings.

DESCRIPTION OF THE EMBODIMENTS (Embodiment 1)

Figure 1:
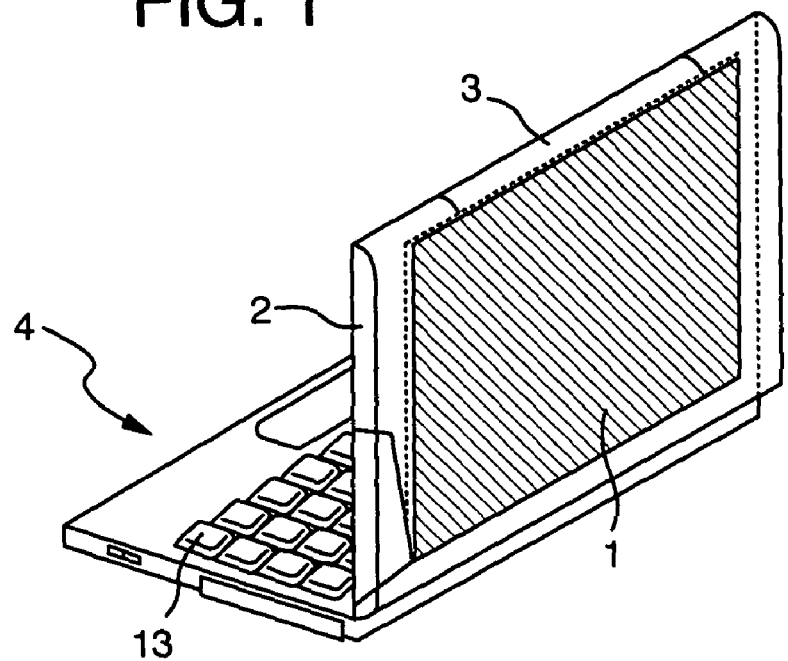
FIG. 1 shows an external appearance of an information electronic device provided with a fuel cell according to a first embodiment of the present invention.
Figure 8:
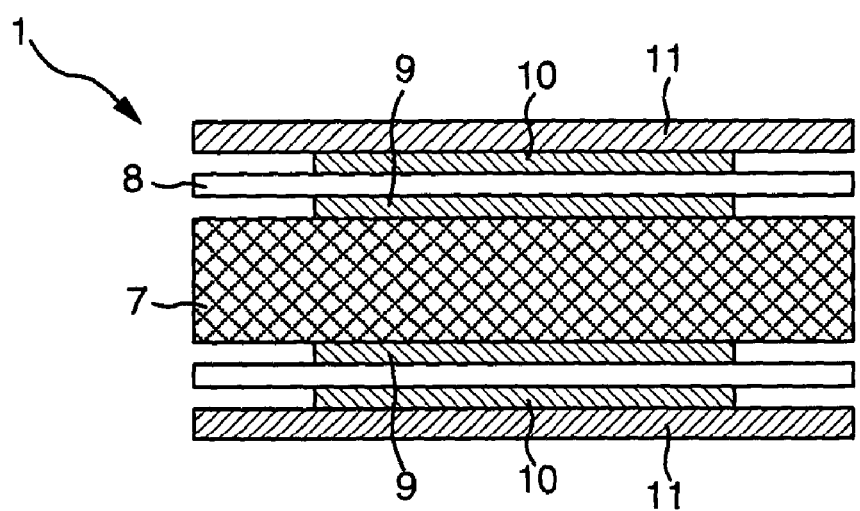
FIG. 8 is a schematic diagram of a cross section of the fuel cell according to the present invention.

FIG. 1 shows an external appearance of an information electronic device provided with a fuel cell according to a first embodiment of the present invention. It is assumed that an information electronic device according to this embodiment is a so-called notebook computer (a personal computer) or a PDA (Personal Digital Assistant), which comprises a main body having semiconductor circuits for executing arithmetic operations and a cover member (display section 2 in FIG. 2) covering the main body. A fuel cell is composed mainly of a power generator panel 1 and a fuel tank 3, and the whole of them all is referred to as a fuel cell. The fuel tank 3 is a container to store a fuel to be supplied to the power generator panel 1. The fuel tank 3 is mounted not on the cover member (display section 2 in FIG. 2) but on the notebook computer main body side. Further, the fuel tank 3 is not integral with the notebook computer but is provided separately. The power generator panel 1 includes electrodes (the anode 9 and the cathode 10 as shown in FIG. 8) and an electrolyte film (FIG. 8), and causes a fuel to react with oxygen from the air. This power generator panel is in a flat plate in this embodiment, and is mounted facing the reverse side (the side without the display 12) of the display section 2 of the information electronic device 4. In this embodiment, an LCD screen is shown as the display 12, but the present invention is not limited to this kind of display. The information electronic device 4 is any of information electronic devices other than a notebook computer as shown in FIG. 1, such as an information electronic device which has a central processing unit (CPU) and a display included in the same casing, and this embodiment can be adopted in an electronic device which is provided with a fuel cell.

Figure 2:
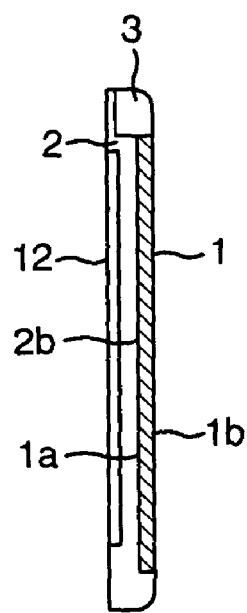
FIG. 2 is a diagram showing a cross section of the display of the information electronic device in a power stop mode.

FIG. 1 shows the fuel cell setting state when power is not supplied, or, in a power stop mode, which means that this fuel cell setting state is linked with turning off of power supply of the information electronic device. FIG. 2 shows the cross section of the display section 2 and the power generator panel 1 of the information electronic device in power stop mode. In the power generator panel 1 of the fuel cell, the surface 1a (hereafter referred to as a first surface) on the display section side of the information electronic device is either in contact with or very close to the information electronic device, and the other surface 1b (hereafter referred to as a second surface) 1b opposite to the first surface facing the display section of the information electronic device is exposed to atmospheric air. The second surface 1b is set integrally with the information electronic device so that the external appearance of the second surface viewed from the rear of the display section 2 is flat. In this embodiment, the external appearance is made to look flat as viewed from the rear of the display section 2 in consideration of design in appearance. The rear side 2b of the display section of the information electronic device is in contact with the first surface 1a so that the power generator panel 1 is integral with the information electronic device, or the rear side of the information electronic device is made closer to the first surface 1a than in power supply mode at least to such an extent that air supply to the first surface 1a is decreased or power generation efficiency is reduced, with the result that the whole of the information electronic device 4 combining the information electronic device with the fuel cell is reduced in thickness and improved in portability.

In addition, by providing a recessed area to accommodate the power generator panel in the rear side 2b of the display section, the portability is further enhanced.

Figure 3:
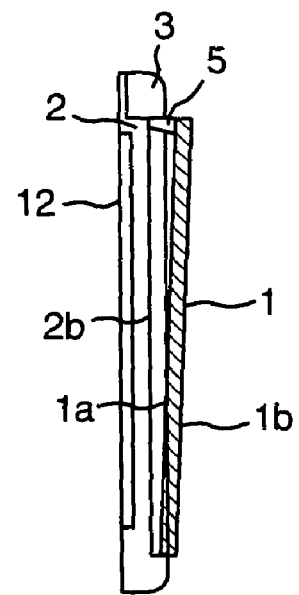
FIG. 3 is a diagram showing a cross section of the display of the information electronic device in a power supply mode.

FIG. 3 shows a cross section of the display section 2 and the power generator panel 1 of the information electronic device when power is supplied, namely, in power supply mode. This power supply mode is linked with turning on of the information electronic device 4. As is clear from FIGS. 2 and 3, the distance between the power generator panel and the electronic device differs between the power supply mode and the power stop mode. In other words, the space between the power generator panel 1 and the information electronic device 4 becomes wide or narrow. The distance between the power generator panel 1 and the information electronic device 4 is put differently, the distance between an arbitrary point in the casing of the power generator panel 1 and an arbitrary point in the casing of the information electronic device 4. In the power generator panel 1 of the fuel cell, by structuring the power generator panel as shown in FIG. 3, a space is formed between the first surface 1a and the display section 2b to supply air through the first surface 1a. Also, the second surface 1b is exposed to atmospheric air and the air can be supplied through this surface. In this manner, as the power generator panel 1 of the fuel cell is shifted from the state in FIG. 2 to the state in FIG. 3, it takes in the air required to produce electricity through two surfaces of the casing of the fuel cell.

The power generator panel 1 is mechanically supported on the display section 2 through a support member 5. The support member 5 is folded (not shown) in the state shown in FIG. 2, namely, in power stop mode, and is pulled out slidingly in power supply mode and enters the state shown in FIG. 3. Then, the support member 5 is slided in power stop mode and returned back to the original position in the information electronic device, in other words, returned to the state shown in FIG. 2. In this embodiment, the support member 5 is formed by a resin frame. The support member 5 is a metal frame or an elastic spring-type structure. The power generator panel 1 and the information electronic device 4 are electrically interconnected by a cable. The power generator panel 1 is connected to a fuel tank 3 by a flexible fuel supply pipe. Thus, when the information electronic device is changed over from the power supply stop mode to the power supply mode and the power generator panel 1 is moved, the electrical connection is maintained and, since the power generator panel 1 is supported mechanically, supply of fuel is also maintained.

The power supply to the information electronic device is limited to a fuel cell as desired, but it is arranged that electric power is obtained from a lithium secondary cell or an AC adapter.

As in conventional coupling between secondary cells and information electronic devices, the fuel cell in this embodiment is so designed as to be electrically and mechanically removable from information electronic devices. Therefore, when it is necessary to change a defective fuel cell, maintenance work is easy to carry out.

When a fuel cell in the present invention is used to replace the existing secondary cell, the place where the existing secondary cell is mounted is used mainly as a place to store electric connectors (not shown) to the fuel tank or the fuel cell.

Electric connectors are preferably designed to maintain compatibility with the secondary cell. The fuel cell comprises the power generator panel 1 and the fuel tank 3, and the power generator panel 1 and the fuel tank 3 are separable from each other. The output terminal (not shown) of the power generator panel 1 is not fixed to the fuel tank 3 but it is wired to the connector of the main body of the information electronic device.

FIG. 8 is a diagram showing a cross section of the power generator panel 1. The power generator panel 1 comprises a plurality of membrane-electrode assemblies (each formed by joining together an electrolyte 8, an anode 9, and a cathode 10, and hereafter referred to as MEA). The MEAs are incorporated in the casing 11 of the power generator panel, and because the casing 11 has slits (not shown) formed in it, the cathode is partially exposed to the outside. Each MEA is supplied with fuel from a fuel supply layer 7. The fuel supply layer 7 is composed of a material holding methanol as a fuel used in this embodiment. The material is desirably a madreporite having a multitude of pores of a size holding a fuel by capillary force and supplying the MEAs with a fuel. For example, a desirable material is a metal madreporite with methanol resistance, a ceramic madreporite or a carbon madreporite. The madreporite with electric conductivity is insulated from the electrodes (not illustrated). Alternatively, the madreporite is formed of glass fiber. In the present invention, a madreporite made of SUS was used. The fuel supply layer 7 holding a fuel is provided to supply electricity even when the fuel tank 3 was dismounted. This is because fuel can be held in the pores of the madreporite for a while even when fuel supply from the fuel tank 3 was interrupted. As the fuel supply layer 7 is larger, the power generation time is longer after the fuel tank 3 is dismounted, but with the information electronic device for which thinning of product thickness is the important task, the fuel supply layer 7 was made 1 mm, which enables a minimum necessary time of 10 seconds or longer to be secured for replacement of the fuel tank 3. As has been described, according to the present invention, it becomes possible to replace the fuel tank while electric connection between the power generator panel 1 and the information electronic device is maintained.

The fuel tank 3 is mounted on top of the power generator panel 1. The fuel is supplied from the fuel tank 3 by using gravity and capillary force. Besides the top of the power generator panel 1, the fuel tank 3 is placed at the installation location for the conventional secondary cell below the power generator panel 1. In other words, it is placed under the palm rest or at the edge portion of the main body of the information electronic device. In this case, fuel transportation from the fuel tank is by capillary force or by a small pump (not shown) built in the information electronic device.

The connectors for electric connections are preferably provided also for a system to transmit information about remaining amount of the fuel in addition to a system to supply electric power required to drive the information electronic device. In all cases, those connectors are provided for the same kinds of systems as when a secondary cell is used. At least one or more systems are dedicated to supply of power and it is all very fine when multiple systems are provided to supply power to the drive parts in the information electronic device. It is preferable to provide a part, such as a DC/DC converter, to change electric power produced by the generator panel 1 to a voltage suitable for the information electronic device, and also provide a super capacitor or an ultra capacitor to cope with instantaneous power.

Also, it is possible to provide power supplies other than the fuel cell, a secondary cell, for example, for use as an auxiliary power supply for starting the information electronic device, a power supply to cover maximum output, and another power supply for monitoring specific events.

Figure 4:
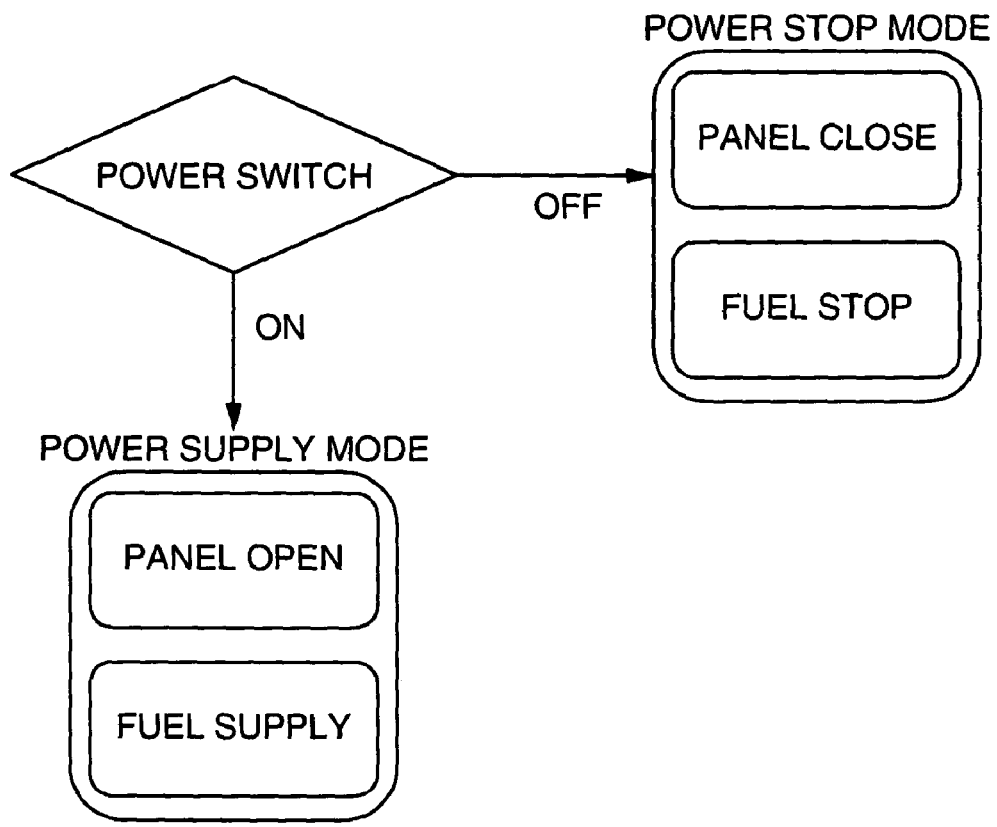
FIG. 4 is a flowchart for explaining the relation between states of a power supply switch of the information electronic device and operations of the fuel cell.

As shown in FIG. 4, when the power switch of the information electronic device is turned on, the power supply mode is detected, the power generator panel 1 of the fuel cell is separated from the main body of the information electronic device, thereby forming a space to supply air from, and the supply of fuel is started. The method by which the power generator panel 1 of the fuel cell is separated from the main body of the fuel cell is electrical or mechanical or manual. No problem occurs when the information electronic device enters a start-up state while the power generator panel 1 of the fuel cell is opened manually. With information electronic devices other than those driven solely by a fuel cell, for example, an information electronic device, which is connected to a fuel cell and a secondary cell or the like, is preferably provided with a function to make a decision whether it is connected with an AC adapter, or a conventional secondary cell or a fuel cell, and so on, when the power switch is turned on.

To stop the information electronic device, the power switch is turned off, at which the power stop mode is detected, and after a specified termination process is finished, the power generator panel 1 of the fuel cell is returned to the former position, namely, into the state shown in FIG. 2, and is substantially in one body with the main body of the information electronic device, and the supply of fuel is stopped. Here, "substantially in one body" means that it appears to be a single body. The method by which the power generator panel 1 of the fuel cell is brought to the former position is electrical or mechanical or manual. When the power generator panel 1 of the fuel cell is brought manually to the former position, the information electronic device may enter the power stop mode. In other words, the on/off operation of the power switch and the power supply/stop mode and the in/out action of the power generator panel 1 may be linked.

Further, a change-over between the power supply mode and the power stop mode is linked with the open/close action between the display section 2 and the main body of the information electronic device.

With the current state of technology, it is difficult for an electrolyte as a component of the MEA to completely block the transmission of methanol. For this reason, when a fuel, such as methanol, directly contacts an electrolyte film 8, which is a part of the power generator, the fuel is consumed even if the information electronic device 4 is not operating. Therefore, in the present invention, the supply and stoppage of the fuel is linked with a switch-over of the power supply mode and the power stop mode, and consumption of fuel such as methanol while the information electronic device 4 is inoperative is minimized and thereby the fuel is saved, namely, a substantially prolonged operation is made possible. When, by improvement of the electrolyte film, the transmission of fuel, such as methanol, is blocked or substantially reduced, it is not always necessary to link supply or stoppage of fuel with a change-over of the power supply mode and the power stop mode.

The power generator panel 1 of the fuel cell when in power supply mode is not necessarily required to be in parallel with the display section 2 of the information electronic device, but the power generator panel may be inclined to facilitate dissipation of steam produced.

This embodiment uses a DMFC for the fuel cell, but the fuel cell is not limited to this type. A wide range of fuel cells, such as PEFC, may be used as long as the structure of the fuel cell is such that air is taken from at least two surfaces of the casing of the fuel cell. The reason for "at least" mentioned above is as follows. Firstly, a structure is conceivable which has an MEA as an air-inlet passage mounted at the end face of the power generator panel 1 other than the first surface 1a and the second surface 1b, and secondly, the structure is not necessarily a rectangular body but may be polygonal in cross section. In this case, when a total sum of the areas through which air is taken is large, the power generation capacity is greater than in the case where air is taken only from two surfaces.

The mounting location of the power generation panel 1 is not limited to the rear of the display section 2, but may be attached to the rear side of the information electronic device (on the underside of the keyboard 13). In this case, legs may be attached to the power generator panel 1 to provide a space between the second surface 1b of the generator panel and the place where the information electronic device is set down (on a desk, for example).

In this embodiment, methanol is used as fuel, but it is possible to use hydrogen or a gas containing hydrogen, a liquid containing hydrogen atoms, such as ethanol, diethyl ether, or ethylene glycol.

(Embodiment 2)

Figure 5:
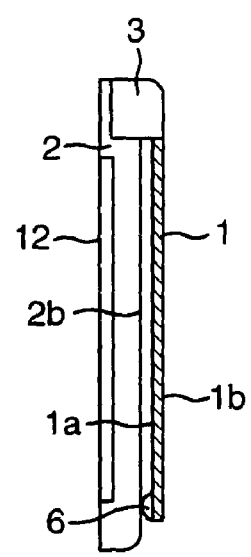
FIG. 5 shows a schematic cross section of the fuel cell and the display section of an information electronic device provided with the fuel cell according to a second embodiment of the present invention.

FIG. 5 shows a sectional view of the fuel cell and the display section 2 of an information electronic device provided with the fuel cell according to a second embodiment of the present invention. The fuel cell comprises a fuel tank 3 and a power generator panel 1, and the fuel tank 3 and the power generator panel 1 are put together as one body. The fuel cell is dismounted from the information electronic device 4. When in power supply mode, the information electronic device is provided with a fuel cell, and when in power stop mode in which the information electronic device 4 is not used, such as in transit, the fuel cell is dismounted from the information electronic device 4, and therefore the information electronic device becomes thinner, and the portability improves.

The power generator panel 1 is in a flat plate, and is mounted at the rear side 2b of the information electronic device in a manner facing the flat display section 2. A projection 6 is formed at a part of the casing of the fuel cell to provide a space between the information electronic device 4 and the fuel cell. This projection may be provided on the information electronic device side.

In the power supply mode in which the fuel cell is provided, in the power generator panel 1 of the fuel cell, the first surface 1a is not substantially in contact with the information electronic device, and the second surface 1b is exposed to the atmospheric air. Therefore, the air can be taken from those two surfaces.

The fuel cell is formed by combining the fuel tank 3 and the power generator panel 1 in a single body, with the result that the fuel cell is simplified in structure, and made easy to manufacture and the price can be reduced.

(Embodiment 3)

Figure 6:
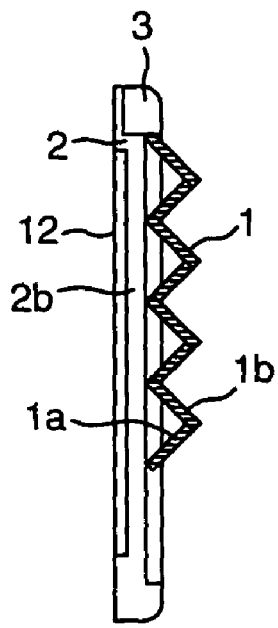
FIG. 6 is a diagram showing a schematic sectional view of a display section of an information electronic device provided with a fuel cell according to a third embodiment of the present invention and the fuel cell in power supply mode.

FIG. 6 shows a schematic cross section of the display section 2 of the information electronic device 4 provided with a fuel cell according to a third embodiment of the present invention and the fuel cell in power supply mode. In the power stop mode, as shown in FIG. 1 of the first embodiment, the power generator panel 1 of the fuel cell is in contact with and in one body with the information electronic device. When the power switch is turned on, the power supply mode is detected, the power generator panel 1 of the fuel cell is separated from the information electronic device 4, by which a space is formed to supply air to the MEAs, and the fuel begins to be supplied. As regards the shape of the space to supply air to the power generator, as shown in FIG. 6, the power generator panel 1 of the fuel cell is bent at least one or more points in a so-called accordion-fold. The mechanism of this bending may be electrical, mechanical or manual as in the first embodiment. When the power generator panel 1 of the fuel cell is moved away manually, the information electronic device may enter a start-up state. The direction in which the panel is bent may be in the horizontal direction (in the direction of the depth in FIG. 6) other than in the vertical direction as shown in FIG. 6. When the information electronic device 4 is stopped, the power switch is turned off as in the first embodiment, at which the power stop mode is detected, and when a specified termination process is finished, the power generator panel 1 of the fuel cell is returned to the former position, comes into contact with the information electronic device 4, and the supply of fuel is stopped.

The method by which the power generator panel 1 of the fuel cell is brought to the former position may be electrical, mechanical or manual. When the power generator panel 1 of the fuel cell is brought to the former position, the information device may enter a power stop mode. Even when the information electronic device is toppled over inadvertently in power supply mode, because the power generator panel 1 of the fuel cell is bent in an accordion-fold, it is less likely to be damaged than the power generator panel structured in a single flat plate.

(Embodiment 4)

Figure 7:
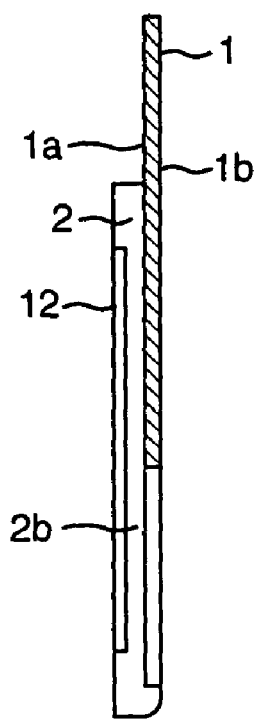
FIG. 7 is a diagram showing a schematic cross section of a display of an information electronic device provided with a fuel cell according to a fourth embodiment of the present invention and the fuel cell in power supply mode.

FIG. 7 is a schematic cross section showing the display section 2 of the information electronic device 4 provided with a fuel cell according to a fourth embodiment of the present invention and the fuel cell in power supply mode. In the stop mode in which electric power is not supplied, the power generator of the fuel cell is substantially in one body with the information electronic device as shown in FIG. 1 of the first embodiment. When the power switch is turned on, the power supply mode is detected, the power generator panel 1 of the fuel cell is slided up beyond the information electronic device 4 (in vertical direction in FIG. 7) to thereby obtain a space to supply air to the first surface 1a of the power generator panel 1, and the fuel begins to be supplied, and the supply of fuel is started. The fuel tank 3 is incorporated in the information electronic device 4, and a small pump is used to supply a fuel to the power generator panel 1 through a flexible fuel supply pipe. Besides a single flat panel type, the power generator panel 1 may be structured such that a flat panel consists of strips which are folded in power supply mode, and the panel unfolds into a single flat panel when power is supplied. As has been described, instead of in the through-thickness direction (the left-right direction in FIG. 7) of the display section 2 of the information electronic device, the power generator panel 1 extends in the vertical direction of the display section 2, so that the information electronic device 4 can maintain the thinness even when it is made operative.

In this case, it is conceivable that the power generator panel is made to extend laterally (in the depth direction in FIG. 7) of the display section 2.

According to the present invention, an electronic device with a fuel cell is provided which is so structured as to supply air from at least two surfaces of the casing for better energy efficiency.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electronic device comprising a main body, and a fuel cell having a first surface for taking in air and a second surface for taking in air and formed in an opposite side to the first surface, wherein when the fuel cell stops supplying power to the main body, the first surface is in a power stop state facing the main body, and wherein when the fuel cell supplies power to the main body, the first surface moves to a power start state remote from the main body as compared with the power stop state.

2. An electronic device according to claim 1, wherein the fuel cell is detachable from the main body.

3. An electronic device according to claim 1, wherein the fuel cell has a fuel tank which supplies fuel, and a power generation portion panel having the first surface and the second surface, wherein when the main body is supplied with power, the fuel cell includes the power generation portion panel.

4. An electronic device according to claim 1, wherein a space between the fuel cell and the main body at a time when the fuel cell supplies power to the main body is larger than the space between the fuel cell and the main body at a time when the fuel cell stops supplying power to the main body.

5. An electronic device according to claim 1, wherein the fuel cell has a fuel tank supplying fuel and a power generation portion panel having the first surface and the second surface, and wherein the fuel is supplied from the fuel tank to the power generation portion panel when a power supply of the main body is turned on.

6. An electronic device according to claim 1, wherein the fuel cell has a fuel tank supplying fuel and a power generation portion panel having the first surface and the second surface, and wherein the supply of fuel from the fuel tank to the power generation portion panel is stopped when a power supply of the main body is turned off.

* * * * *